Feb. 26, 1963   J. F. CONNELLY ET AL   3,079,556
EXPANDED SCALE ELECTRICAL INDICATING INSTRUMENT
Filed Aug. 13, 1959   3 Sheets-Sheet 1

INVENTOR.
BY John F. Connelly
ROBERT J. MULLIGAN
Peck & Peck

INVENTOR.
John F. Connelly
Robert J. Mulligan
BY Peck & Peck
Attorneys

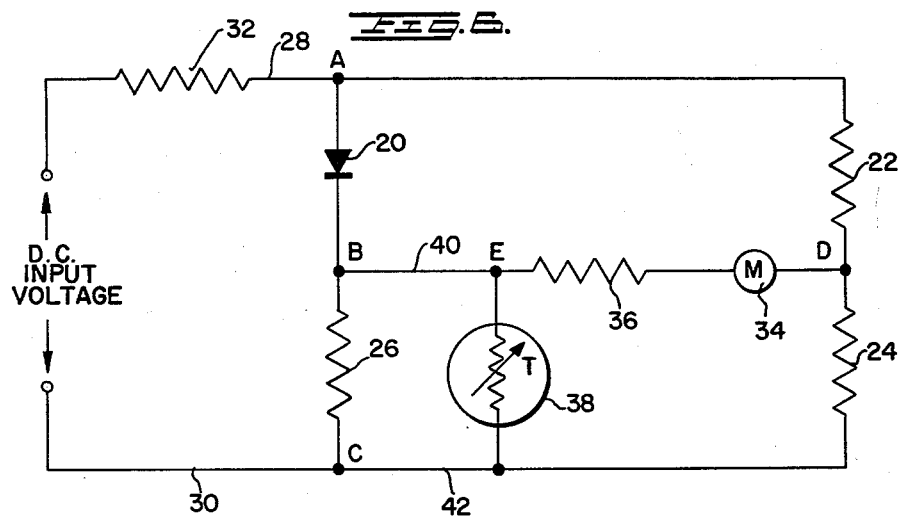
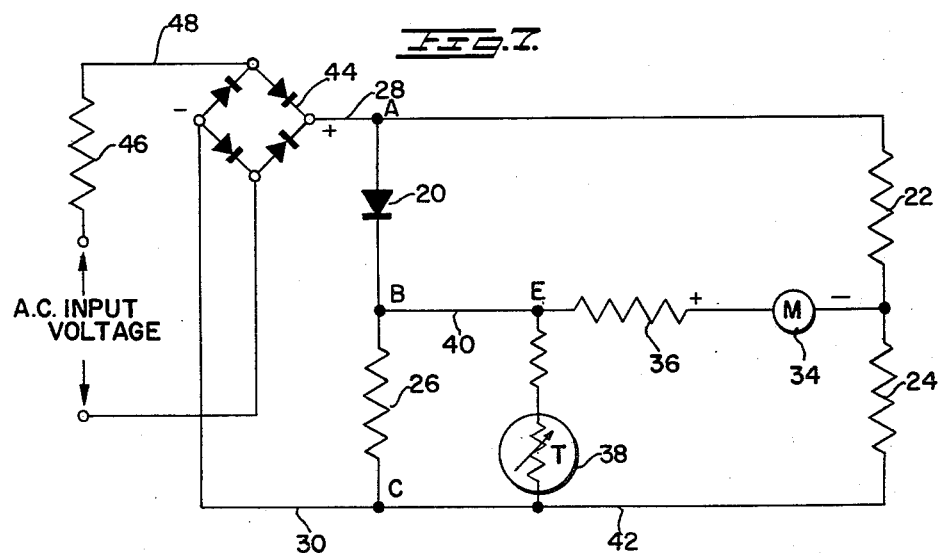

United States Patent Office 3,079,556
Patented Feb. 26, 1963

3,079,556
EXPANDED SCALE ELECTRICAL INDICATING INSTRUMENT
John F. Connelly, Milford, and Robert J. Mulligan, Hamden, Conn., assignors to International Instruments, Incorporated, New Haven, Conn., a corporation of Connecticut
Filed Aug. 13, 1959, Ser. No. 834,369
1 Claim. (Cl. 324—131)

This application is a continuation in part of application Serial No. 724,539, filed by John F. Connelly on March 28, 1958, now abandoned.

This invention relates broadly to expanded scale electrical indicating instruments and in its more specific aspects it relates to such instruments in which an improved performance is obtained in the utilization of non-linear, semi-conducting current device in which the voltage drop of the device varies in accordance with the voltage to be measured; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

In the usual electrical indicating meter or instrument, there are a definite number of parts per division throughout the range or length of the scale for a given measured quantity. With the use of any expanding circuit or device, a certain portion of the measured quantity may be selected and be indicated on a meter with the same number of parts per division over the scale length, thereby providing higher readability of that selected portion than is possible without such expanding device.

The previous instruments using such expanding devices, in general, have been restricted to one range that is subject to expansion, and usually employ complex circuitry. Other instruments obtain expansion by a mechanical suppression of the near zero values, or by a means for triggering a gaseous discharge device that is in the expansion circuit.

Accordingly, the present invention is directed to an expanded scale electrical indicating instrument having the expansion feature thereof accomplished with the use of one non-linear semi-conducting device such as a diode, but not exclusive of the use of more recently developed devices such as transistors, zener diodes, cryotrons, or the like, and wherein the diode device is used with three resistors in a Wheatstone bridge arrangement. If increased sensitivity is desired or necessary as a characteristic in the instrument, the expansion feature of the instrument may be accomplished with the use of two diodes and two resistors in a Wheatstone bridge arrangement, preferably in which the diodes and resistors, respectively, are oppositely related in the Wheatstone bridge arrangement.

The new instrument which we have devised, which is basically a direct current device, may, with the use of a suitable rectifier circuit, be operated for measuring alternating currents as well.

The invention also seeks to provide a novel instrument for measuring on an expanded scale such that with no voltage applied to the instrument, the indicating needle of the meter will indicate zero.

Therefore it is an object of the invention that the expanded scale electrical indicating instrument, being basically a low voltage device may, with the use of a suitable series-connected resistor for achieving a voltage dropping function, provide an expansion of low as well as high voltages with a percentage of expansion thereof in the same order of magnitude as the expansion of high voltages.

Perhaps one of the outstanding advantages of the new circuit resides in the simplicity of the instrument, having no requirement for auxiliary reference electromotive forces, electromechanical devices, restriction to measuring alternating current voltages only, use of bucking voltages, or use of voltage source in a Wheatstone bridge for measuring voltages above the firing voltage of the VR tubes. These prior art devices lend to the complexity of the expanded scale instruments as well as limiting in some way the use of such an instrument.

It is desirable to provide means for compensating for temperature variations in the basic circuit and we have devised unique circuitry whereby this may be accomplished.

In providing temperature compensation for the basic circuits which involve a non-linear semi-conducting component we encountered serious problems which we have solved in a manner as will be pointed out hereinafter.

In the circuitry of this invention we have also provided means which drops the voltage to the indicating meter which results in a larger voltage span.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 6 is a schematic circuit diagram involving the temperature compensating means and a series resistance for selecting different operating points of input voltage for dropping the voltage to the meter.

FIG. 7 is a schematic circuit diagram similar to FIG. 6 but utilizing an A.C. rectifier.

Figure 1:
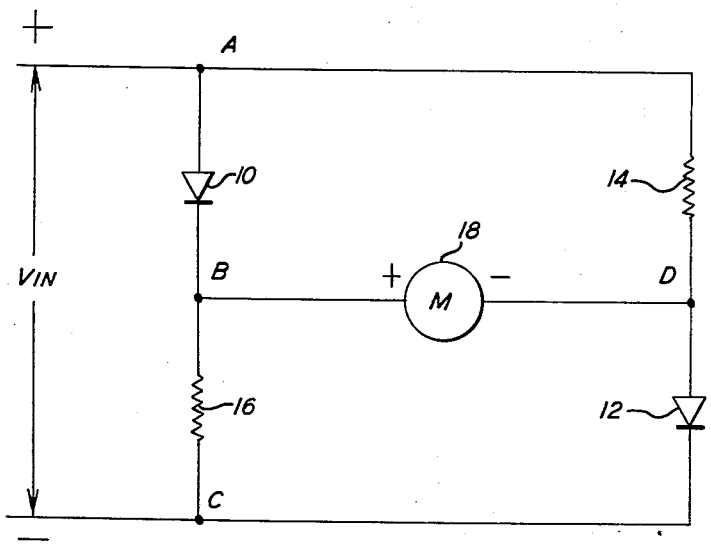
FIG. 1 is a schematic circuit diagram employing the principle of the invention.

Referring now to FIG. 1; a schematic circuit diagram of the basic embodiment of the features of the present invention is shown of the highest sensitivity type in which diodes 10, 12 and resistors 14, 16 are arranged in a Wheatstone bridge arrangement comprising terminals A, B, C, D. A high impedance, high sensitivity electrical indicating meter 18 is connected across the output terminals B, D, and if a voltage $V_{IN}$ is applied to input terminals A, C, then there is derived at the terminals to the meter an output voltage $V_{BD}$.

Figure 3:
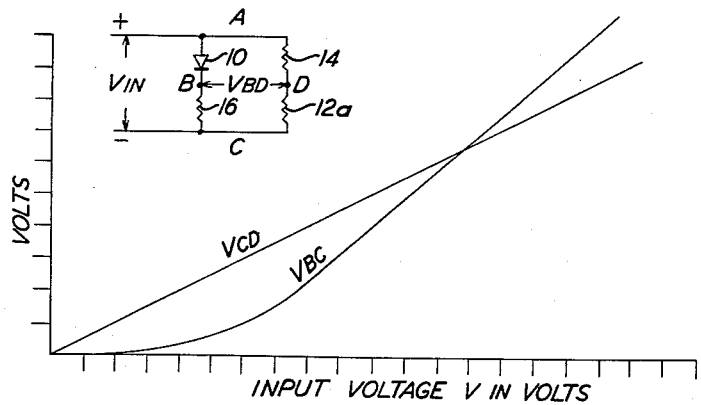
FIGS. 3–5 are graphs showing the relationship of the output voltage $V_{BD}$ versus the input voltage $V_{IN}$ for the composite circuit elements indicated therewith.

A circuit design within the purview of the invention having lower sensitivity than the embodiment of FIG. 1, is shown in the circuit related to the graph of FIG. 3, wherein one of the diodes, such as diode 12 of FIG. 1 has been substituted by a resistor element 12a.

Figure 5:
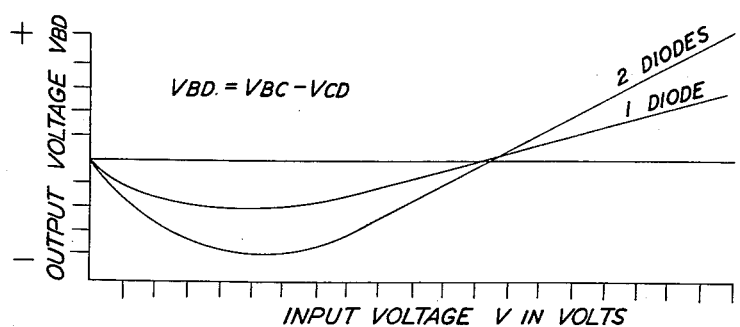

The graph in FIG. 5 shows the relationship between the input voltage $V_{IN}$ and the output voltage $V_{BD}$. It is observed from the graph that the voltage $V_{BD}$ is negative in value as the applied input voltage is low and thence reverses to a positive value of voltage as the applied input voltage increases. The effect on the indicating meter 18, assuming that it has a zero-on-the-left scale, is that the pointer of the meter will leave zero and progress toward the left when the polarity of the output voltage $V_{BD}$ is negative, where the pointer may hit a stop element positioned off the left end of the scale of the meter. As the input voltage $V_{IN}$ is increased in value, the pointer progresses toward the zero region of the scale and then proceeds to the right of zero when the output voltage $V_{BD}$ is positive in polarity. The scale then may be read to determine the value of the input voltage $V_{IN}$.

The input voltage $V_{IN}$ corresponding to the negative output voltage $V_{BD}$ cannot be indicated on the scale. The minimum value of this input voltage $V_{IN}$ that cannot be indicated on the scale is approximately 2 volts.

The input voltage $V_{IN}$ corresponding to the positive output voltage $V_{BD}$ is indicated on the scale and is a portion only of the total input voltage. Hence, in using the positive output voltage responsive to a specified input voltage, an expanded scale electrical indicating instrument is achieved.

Figure 2:
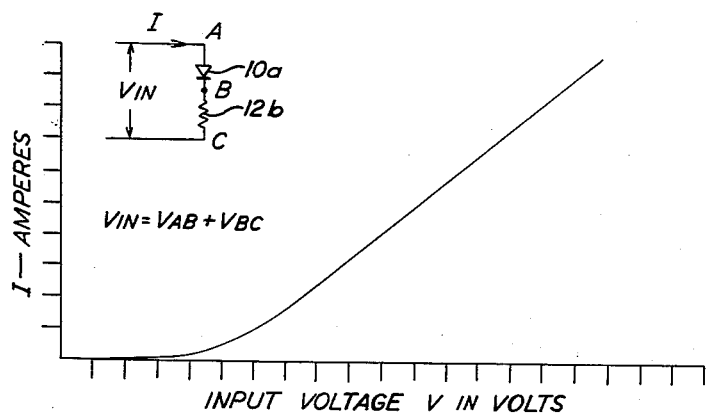
FIG. 2 is a graph showing the relationship of the current I versus the input voltage $V_{IN}$ for the composite circuit elements shown therewith.

The theory of operation of the invention is understood upon examining the graphs shown in the drawings in conjunction with well known features of diodes and resistors. In the basic voltage-ampere characteristic of a diode, the low voltage range is well known to have a non-linear curve, but as the voltage values increase, the curve becomes more nearly linear. The basic voltage-ampere characteristic of a conventional resistor is described by Ohm's law and can be shown as a straight line. If a diode and a resistor are connected in series and an input voltage $V_{IN}$ applied thereacross, the composite voltage-ampere characteristic of the series arrangement can be derived by plotting a curve having a summation of the current values under the curve of the diode and resistor characteristic curve for several specified values of input voltage $V_{IN}$. This result in summation is shown in the graph of FIG. 2, while the circuit for deriving the summation of the diode and resistor voltages is shown in the circuit related to the graph of FIG. 2, including a single diode 10a and resistance 12b.

Referring now to FIG. 3, a graph is shown for a circuit related thereto, in which resistors are included in the circuit configured in the form of a bridge, so that the resistors are connected across the terminals A, D and C, D respectively. The voltage across the terminals is shown as $V_{CD}$ and because it is a resistance following Ohm's law, the line $V_{CD}$ is shown as a straight line. There is shown in the graph the voltages $V_{CD}$ and $V_{BC}$ versus the input voltage $V_{IN}$. While the voltage $V_{CD}$ is simply a straight line since the current through the path including the terminals A, D, C is through resistive components only, the voltage $V_{BC}$ is not straight even though it includes a resistor between terminals B, C, because there is serially connected in this branch of the circuit a diode. The curve for voltage $V_{BC}$ corresponds to that shown in FIG. 2 for voltage $V_{IN}$. The voltage $V_{BC}$ across the resistor 16 connected between terminals B, C is equal to the current shown in FIG. 2 multiplied by the resistance value of resistor 16. The voltage $V_{BC}$ may then be plotted as a function of the input voltage $V_{IN}$ shown in FIG. 3.

By circuit analysis the voltage $V_{BD}$ across the terminals B, D is equal to the value of $V_{BC}$ minus $V_{CD}$; hence the equation $$V_{BD} = V_{BC} - V_{CD}$$

A plot of the equation is shown in FIG. 5 which is labeled "One Diode."

Figure 4:
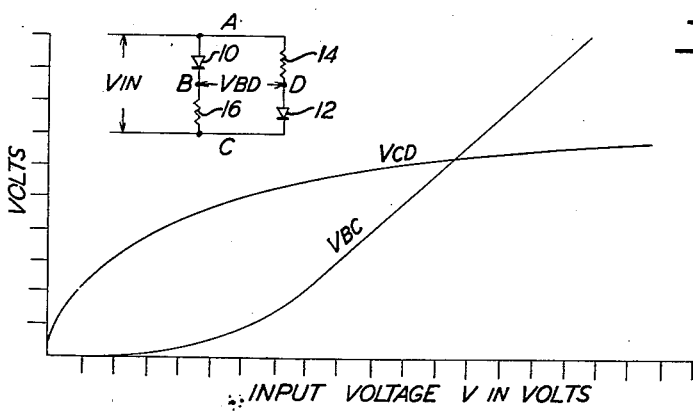

FIGURE 4 shows a graph for achieving high sensitivity and is accomplished by the use of two diodes. The curve for voltage $V_{BC}$ is the same as in FIG. 3. The voltage $V_{CD}$ versus the input voltage $V_{IN}$ is obtained from the voltage curve of FIG. 2 taken in conjunction with the characteristic voltage-current curve of the diode mentioned above, since the curve of FIG. 2 gives the current for a given value of input voltage and the voltage across the diode at this current value may be obtained from the characteristic voltage-ampere curve of the diode. Again the equation $$V_{BD} = V_{BC} - V_{CD}$$

and a plot of the equation for a circuit with two diodes as arranged in FIG. 1 is shown in FIG. 5 and labeled "Two Diodes."

FIGURE 5 shows the curves of the output voltage $V_{BD}$ versus the input voltage $V_{IN}$. It is seen that the increased slope using two diodes results in a higher voltage drop $V_{BD}$ per increase of input voltage $V_{IN}$ than with the use of the bridge arrangement with one diode. It is also seen that with the circuit having two diodes, the amplitude of the negative portion of the curve from the zero line is about twice the amplitude as for the curve for the circuit having one diode. For this reason the meter to be employed must be able to meet and withstand the negative voltage overload condition.

The curves of FIGURE 5 are predicated upon an infinite impedance across terminals B, D for these theoretical considerations. It will be found by experiment that a meter of high sensitivity and high impedance decreases the slope of the straight line portion of the curve only slightly, and also lowers the amplitude of the negative voltage overload. This effect is not considered of consequence since the expansion obtained is sufficient for practical purposes.

In FIG. 6 of the drawings we have illustrated a schematic circuit diagram including the basic features of the circuits illustrated in FIGS. 1–5 with certain refinements which increase the accuracy of the indications and compensate for temperature variations to adapt the circuit for wider and more general use.

In the circuit of FIG. 6 a diode 20 in the forward direction, and resistors 22, 24 and 26 are arranged in a Wheatstone bridge arrangement comprising input terminals A and C and output terminals B and D. Leads 28 and 30 feed the input voltage to the input terminals and in lead 28 we place a resistor 32 in series with the bridge circuit in order to select different operating points of input voltage. A high impedance, high sensitivity electrical indicating meter 34 is connected in series with a resistor 36 and across output terminals B and D. To provide for compensation for temperature variations I provide a high resistance thermistor 38 connected across conductors 40 and 42 and in parallel with resistor 26.

In evolving the successful circuit of FIG. 5 it has been necessary to analyze the circuit in order to select a thermistor having the correct change in resistance with temperature and to select components of the circuit having certain characteristics which we shall point out hereinafter.

It is known that the diode is the most temperature sensitive element of the circuit and tests which we have carried on establish that keeping a constant current to the diode results in the least change in resistance with temperature. Since the resistor 32 which is in series with the bridge circuit will, depending on its resistance, tend to limit the current to the bridge circuit and hence to the diode it is significant to know how the values of this resistance vary for the desired input voltages and the effect this resistance has on current limiting and to select the proper resistor 32.

In the consideration of resistor 32 in the circuit there is a definite series resistance for a given input voltage. The percent change in diode resistance with temperature variations changes slowly for values of series resistance of 10,000 ohms or higher. An average value of 16% has been selected for the operative points of interest since this gives sufficient correction for eliminating the gross error due to the diode temperature sensitivity. Our experiments have established therefore that the value of resistor 32 should be at least 10,000 ohms, for at less, severe changes in diode resistance occur, and compensation for a 16% change will be ineffective. The resistor 32 may be a manganin wire wound resistor with an extremely small temperature coefficient and does not change appreciably over the temperature range on the order of 23° C. to 50° C.

Since the network of this invention is used in conjunction with an electrical indicating meter which will absorb power in a bridge circuit when unbalanced, the compensation must take into account the effect of an unbalanced bridge.

It is desired that the meter read with the zero at the left, so that with no power to the device the meter will indicate zero. With an expanded scale meter it is most desirable that it be compensated perfectly in the center of the scale, as this is usually the point of interest and is one of unbalance in the bridge circuit.

The experiments which we have conducted have shown that compensation for the unbalanced bridge at the midscale point of the meter will occur by selecting a thermistor which in shunt with the resistor 26 will change the compensating leg resistance (resistor 26 plus thermistor 38 in parallel) by 148 ohms over a temperature range of 23° C. to 50° C. The resistor 26 may be a carbon deposit resistor having a value of approximately 1,100 ohms which changes approximately 8 ohms from 23° C. to 50° C. and the effect on the parallel combination of itself and the thermistor accounts for only a few ohms.

It will be appreciated that the entire circuit is subject to temperature and thus the types of the various components thereof may be significant. For instance, we prefer the resistors 22 and 24 to be carbon deposit with a low temperature coefficient, and since they are on opposite arms of the bridge, their effect will be to cancel each other.

The resistor 36 is a series resistor functioning to drop the voltage to the meter. In effect, it would require a higher voltage between terminals E and D to indicate full scale on the meter, the end result being a larger voltage span. Thus the voltage may be maintained at a certain value by resistor 32 and the voltage spread is varied by the resistor 36. Our experiments indicate satisfactory operation where the resistor 36 has a value of approximately 1,000 ohms.

In FIG. 7 we have illustrated our circuit using an A.C. rectifier and in this form of the invention we have used the same reference numerals as heretofore used to identify similar components. This network includes a rectifier 44, lead 48, and resistor 46 placed in series with the thermistor. The rectifier being a temperature sensitive element, tends to compensate for the diode which offsets the loss of effectiveness of the thermistor caused by its series connection with the resistor.

It will now be apparent that our new circuit may be used for measuring voltages on a scale of a meter in which the lower voltage values are suppressed to negative or near zero values and high voltage values are accurately measured due to the linearity of the circuit for the high voltage values; and that we have combined temperature compensating means in the circuit in a unique manner.

We have thus devised a circuit wherein minute variations of the high voltages are apparent while similar variations of lower voltages are not apparent, having been suppressed.

We claim:

A circuit for measuring voltage over a range of measurement on an expanded scale basis, comprising a four-arm bridge having two pairs of opposite terminals, one of the pairs of opposite terminals provided for connection to the voltage to be measured, and the other pair of opposite terminals provided for connection to a volt meter, two of the arms of the bridge connected between said first-named pair of opposite terminals having linear resistances connected in series and one of said arms connected between said first-named pairs of opposite terminals having linear resistance and the other of said arms having a non-linear, semi-conductive current device characterized by being operable at approximately two volts and being subjected to voltage of one polarity, the resistance of said non-linear semi-conductive current device changing solely as a direct result of an increase or decrease in applied voltage of the same polarity, and said circuit including a series resistor in series with said bridge circuit for selecting different operating points of input voltage, the circuit being such that the voltage drop at the terminals for the volt meter varies in accordance with the voltage to be measured, and temperature compensating means connected between the terminals provided for the volt meter and in shunt with said one of said arms having linear resistance whereby the combined resistances of said temperature compensating means and said linear resistance in said one of said arms will be varied with temperature variations.

References Cited in the file of this patent
UNITED STATES PATENTS

| | | |
|---|---|---|
| 1,929,216 | Pfannenmuller | Oct. 3, 1933 |
| 2,431,992 | Dalzell | Dec. 2, 1947 |
| 2,449,072 | Houghton | Sept. 14, 1948 |
| 2,526,329 | Chamberlain | Oct. 17, 1950 |
| 2,571,458 | Lawrence | Oct. 16, 1951 |
| 2,584,800 | Grisdale | Feb. 5, 1952 |
| 2,693,572 | Chase | Nov. 2, 1954 |

FOREIGN PATENTS

| | | |
|---|---|---|
| 780,118 | Great Britain | July 31, 1957 |

OTHER REFERENCES

Publication, "Applications of Silicon Junction Diodes," in "The Capacitor," vol. 22, No. 5, May 1957, by Cornell-Dubilier Electric Corp., pages 3 through 8 relied on. May 1957.